(12) United States Patent
Mizuno et al.

(10) Patent No.: US 7,587,627 B2
(45) Date of Patent: Sep. 8, 2009

(54) SYSTEM AND METHOD FOR DISASTER RECOVERY OF DATA

(75) Inventors: Kazuhiko Mizuno, Hachioji (JP); Shinji Fujiwara, Sagamihara (JP); Yoshio Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 489 days.

(21) Appl. No.: 11/224,112

(22) Filed: Sep. 13, 2005

(65) Prior Publication Data

US 2006/0271815 A1 Nov. 30, 2006

(30) Foreign Application Priority Data

May 31, 2005 (JP) ............... 2005-158269

(51) Int. Cl.
*G06F 12/00* (2006.01)
(52) U.S. Cl. ............... 714/6; 714/5; 707/202; 707/204
(58) Field of Classification Search ........ 714/6, 714/19, 20, 5, 15–16
See application file for complete search history.

(56) References Cited

U.S. PATENT DOCUMENTS

| | | | | |
|---|---|---|---|---|
| 5,615,329 | A * | 3/1997 | Kern et al. ............... | 714/6 |
| 5,742,792 | A * | 4/1998 | Yanai et al. ............... | 711/162 |
| 6,009,100 | A * | 12/1999 | Gausmann et al. ........ | 370/397 |
| 6,442,706 | B1 * | 8/2002 | Wahl et al. ............... | 714/6 |
| 6,618,818 | B1 * | 9/2003 | Wahl et al. ............... | 714/6 |
| 6,643,795 | B1 * | 11/2003 | Sicola et al. ............. | 714/6 |
| 7,103,797 | B1 * | 9/2006 | Wahl et al. ............... | 714/6 |
| 2001/0036177 | A1 * | 11/2001 | Hallenstal et al. ........ | 370/354 |
| 2002/0032692 | A1 * | 3/2002 | Suzuki et al. ............. | 707/200 |
| 2003/0041074 | A1 * | 2/2003 | Vasudevan et al. ........ | 707/204 |
| 2003/0074600 | A1 * | 4/2003 | Tamatsu .................. | 714/6 |
| 2003/0217119 | A1 * | 11/2003 | Raman et al. ............. | 709/219 |
| 2004/0098425 | A1 * | 5/2004 | Wiss et al. ................ | 707/204 |
| 2004/0167972 | A1 * | 8/2004 | Demmon .................. | 709/219 |
| 2004/0193658 | A1 * | 9/2004 | Kawamura et al. ........ | 707/202 |
| 2004/0193945 | A1 * | 9/2004 | Eguchi et al. ............. | 714/6 |
| 2004/0236984 | A1 * | 11/2004 | Yamasaki ................. | 714/6 |
| 2004/0268177 | A1 * | 12/2004 | Ji et al. .................... | 714/6 |
| 2005/0015657 | A1 * | 1/2005 | Sugiura et al. ............ | 714/6 |
| 2005/0102553 | A1 * | 5/2005 | Cochran et al. ........... | 714/6 |
| 2005/0165851 | A1 * | 7/2005 | Goyal ...................... | 707/200 |
| 2006/0195666 | A1 * | 8/2006 | Maruyama et al. ........ | 711/162 |

OTHER PUBLICATIONS

"Storeplaza" www.hitachi.co.jp/storeplaza. pp. 1-14. 2002.

* cited by examiner

*Primary Examiner*—Scott T Baderman
*Assistant Examiner*—Chae Ko
(74) *Attorney, Agent, or Firm*—Brundidge & Stanger, P.C.

(57) ABSTRACT

When a public line is used for a remote copy function of storage in a disaster recovery (DR) system, the online performance is degraded due to the increase and decrease of the line utilization rate. Therefore, it is desired to change the remote copy function depending on the line utilization rate. Also, there is the possibility of data loss if disaster occurs during the copy between storage devices. Therefore, it is desired to perform the processing to detect the data status immediately before the occurrence of the disaster. By switching the synchronous transmission and the asynchronous transmission in accordance with the increase and decrease of the response time of the remote copy function between storage devices, the online performance of the primary site can be maintained without being influenced by the line utilization rate, and the data loss can be detected based on the used remote copy function.

7 Claims, 10 Drawing Sheets

SYSTEM AND METHOD FOR DISASTER RECOVERY OF DATA

CROSS-REFERENCE TO RELATED APPLICATION

The present application claims priority from Japanese Patent Application No. JP 2005-158269 filed on May 31, 2005, the content of which is hereby incorporated by reference into this application.

TECHNICAL FIELD OF THE INVENTION

The present invention relates to a system and a processing method thereof for reducing the degradation of online performance and for detecting the data loss when a disaster or a failure has occurred in the DR (Disaster Recovery) system in which a database server and a storage are incorporated.

BACKGROUND OF THE INVENTION

In recent years, IT has been fundamental to business and taken on a growing importance. Thus, the effect of a system down is enormous. In the case of finance industry, for example, it is reported that the loss due to the system down reaches several million dollars by hour. In such an environment, a disaster recovery (hereinafter referred to as DR) to backup data to a remote site in order to continue the business even if any disaster occurs has come under the spotlight.

As a technology for realizing the disaster recovery, the technology is known, in which data update history information (primary log) of a storage device mounted in a primary site is copied to a storage device mounted in a remote site (hereinafter, this copy is referred to as "remote copy"), and the data of the primary site is recovered to the storage device of the remote site based on the copied log (secondary log) (Hereinafter, this technology is referred to as "DR system using Log synchronous transmission method"). In this DR system using Log synchronous transmission method, when the update of the primary log of the primary site, after the update of the secondary log is confirmed, the system processing of the primary site is performed (this is referred to as synchronous transmission). Therefore, it is possible to acquire the backup data with no data loss.

The technology for the remote copy between the storage devices of the primary site and the remote site is described in a catalog of "Hitachi integrated storage solution "Storeplaza"". This is the technology, in which the storages of a plurality of systems are connected through the fiber channel, and when a disk drive of one storage device is updated, this data update is reflected on the disk drives of the other storage devices.

SUMMARY OF THE INVENTION

In the DR system using log synchronous transmission method described above, the line used for the remote copy between storage devices is a dedicated line such as a fiber channel, and it takes the line cost of several million to several tens million yen per month. For the customer who wants to establish the DR system using log synchronous transmission method, the reduction of the line cost is required.

As a method for reducing the line cost, the use of a public line, which is inexpensive but its line quality is not ensured, as a line for the remote copy has been studied. In the case of the public line, since the line utilization rate changes depending on the end users, the band used in the remote copy cannot be secured. As a result, there is a possibility that the time required for the remote copy is increased.

Also, in the DR system using log synchronous transmission method, the log which is the data update history information is copied to the remote site by the synchronous transmission. Therefore, when the performance of the remote copy is degraded, the online processing in the primary site cannot be performed, and the online processing performance is degraded.

As a method for reducing the above-described degradation of the online performance due to the line utilization rate, the remote copy method is known, in which, after the update of the log of the primary site, the online processing of the primary site is performed without confirming the update of the log of the remote site (referred to as asynchronous transmission). In this asynchronous transmission, however, since the update of the log of the remote site is not confirmed, it is not assured that the date in the primary site is all copied to the remote site. Therefore, there is the possibility that the backup data of the remote site is lost when the disaster occurs in the primary site.

An object of the present invention is to maintain the online processing performance of the primary site in the DR system using log synchronous transmission method and a public line by switching the synchronous transmission and the asynchronous transmission depending on the utilization of the line used for the remote copy.

The utilization of the line is acquired from the response time required for the remote copy between the storage devices. When this response time is long, the line utilization rate is high, and when it is short, the line utilization rate is low.

Therefore, when the response time is long, the asynchronous transmission is used for the copy between the storage devices, and when the response time is short, the synchronous transmission is used for the copy between the storage devices. By doing so, the primary site is not influenced by the line delay of the remote copy between the storage devices. Therefore, it is possible to maintain the online processing performance.

On the other hand, in the asynchronous transmission, there is the possibility that the backup data is lost when the disaster occurs as described above. Therefore, in the present invention, the remote copy method between the storage devices is always monitored, and the occurrence of the data loss is detected based on the remote copy method just before the disaster.

In the case where the synchronous transmission is used for the copy between the storage devices when the disaster occurs, since the log of the primary site is all copied to the remote site, data loss does not occur. Also, in the case where the asynchronous transmission is used for the copy between the storage devices, since it is not assured that the date in the primary site is all copied to the remote site, there is the possibility that the backup data of the remote site is lost.

As described above, since data status in the remote site can be acquired by the detection of the data loss, it is possible to reduce the time required for the recovery from the failure.

According to the present invention, the line utilization rate between storage devices is calculated based on the response time between the storage devices, and the remote copy function between storage devices is switched to the synchronous transmission or the asynchronous transmission depending on the length of the response time. Therefore, even when the line utilization rate between the storage devices is high, the online performance of the primary site can be maintained without being influenced by the line delay.

Also, since the state of the remote copy function between storage devices is retained in the remote site, it is possible to easily find the occurrence of data loss of the backup data of the remote site when a disaster or failure occurs, and the time required for the recovery from the disaster or the failure can be reduced.

BRIEF DESCRIPTIONS OF THE DRAWINGS

DESCRIPTIONS OF THE PREFERRED EMBODIMENTS

Hereinafter, embodiments of the present invention will be described based on FIG. 1 to FIG. 9.

First Embodiment

First, the first embodiment of the present invention will be described with reference to FIG. 1 to FIG. 3.

Figure 1:
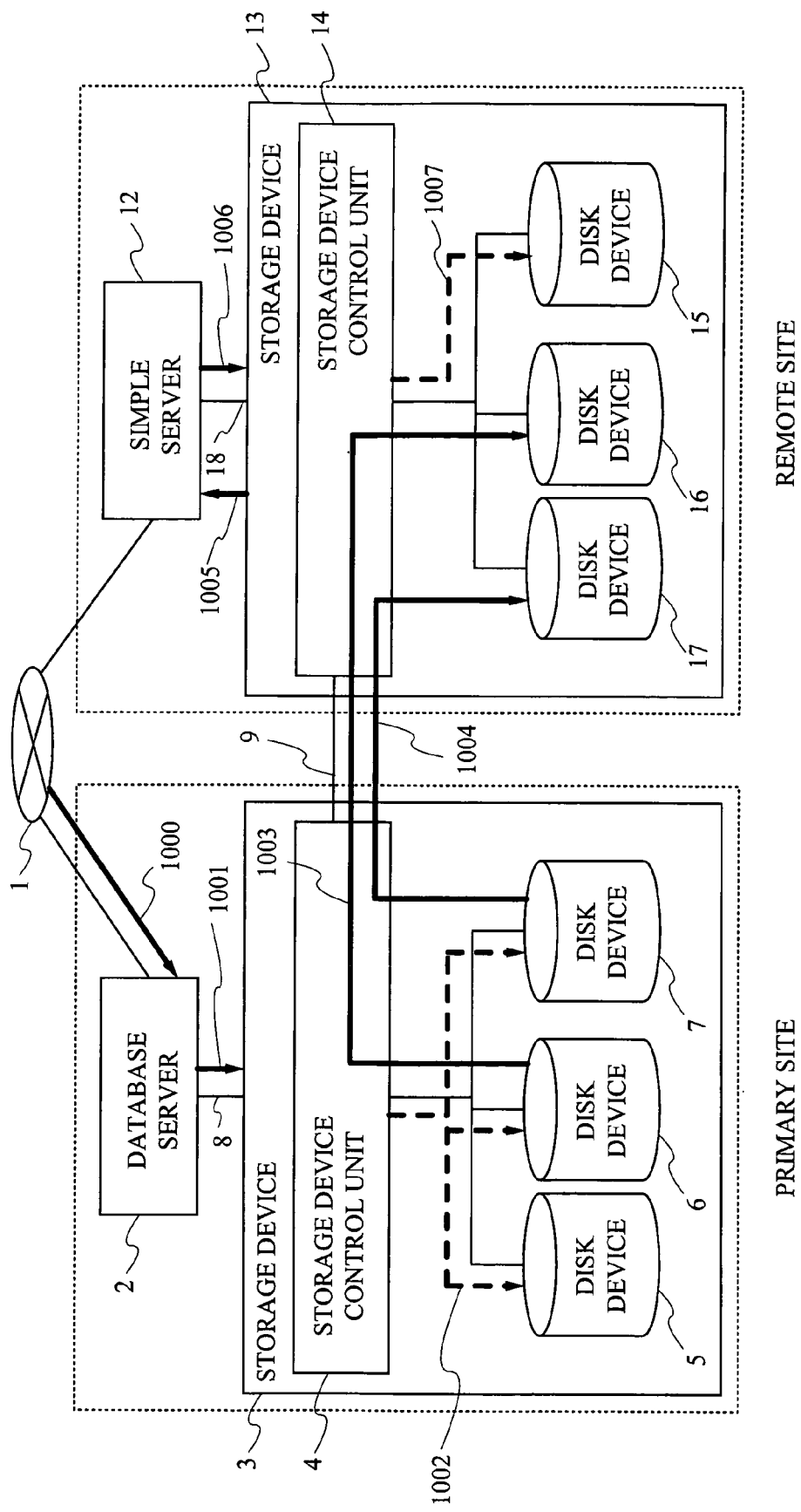
FIG. 1 is a block diagram showing the entire configuration of the DR system using log synchronous transmission method according to the first embodiment of the present invention.

FIG. 1 shows the brief overview of the first embodiment of the DR system using log synchronous transmission method. In FIG. 1, a primary site is comprised of a database server 2 and a storage device 3. The database server 2 and the storage device 3 are connected by a server/storage connection interface 8. The storage device 3 includes disk devices 5, 6 and 7 in which data to be read and written by a storage device control unit 4 is stored, and the storage device 3 retains the data for online processing received by the database server 2 through an operation network 1, the data required for the processing, and the data executed in the database server 2.

The database server 2 and the storage device 3 read and write data through the server/storage connection interface 8. In addition, when the change in the disk devices 5, 6 and 7 requested by the database server 2 is performed, the storage device 3 notifies the change to the database server 2.

The remote site is comprised of a simple server 12 and a storage device 13. The simple server 12 and the storage device 13 are connected by a server/storage connection interface 18. The simple server 12 has a function of the database server which recovers the data based on the log. The storage device 13 includes disk devices 15, 16 and 17 in which the data to be read and written by the storage device control unit 14 is stored, and the storage device 13 retains the data recovered by the simple server 12.

The simple server 12 and the storage device 13 read and write data through the server/storage connection interface 18. In addition, when the change in the disk devices 15, 16 and 17 requested by the simple server 12 is performed, the storage device 13 notifies the change to the simple server 12.

The storage device 3 of the primary site and the storage device 13 of the remote site are connected through a storage device connection interface 9 between the storage device control units 4 and 14. The storage devices 3 and 13 have a remote copy function to copy the contents of the disk devices 5, 6, 7, 15, 16 and 17 between the storage devices 3 and 13 through the storage device connection interface 9 if set in advance.

As the remote copy function to copy the storage devices 3 and 13, the synchronous transmission and the asynchronous transmission are known. The synchronous transmission is the transmission method in which, when the writing process is performed in the primary site, after updating the disk device of the primary site, the update similar to that of the primary site is confirmed in the disk device of the remote site, and then, the writing process of the primary site is finished. Also, the asynchronous transmission is the transmission method in which, when the writing process is performed in the primary site, after updating the disk device of the primary site, the writing process of the primary site is finished without confirming the update of the disk device of the remote site.

In the DR system using log synchronous transmission method, two or more disk devices in which the log is to be written are prepared in the primary site, and the disk devices are copied between the storage devices 3 and 13. In this copy operation, the disk device copied by the synchronous transmission and that copied by the asynchronous transmission are separately prepared. Therefore, in response to the write request to the respective disk devices from the database server 2, the update contents can be copied to the remote site by the synchronous transmission or the asynchronous transmission.

The log mentioned here is the data update history information showing the update operation of the database, and the database can be reestablished by executing the log. For example, it includes the transaction log executed by the database and the SQL of all of the operation requests received by the database server.

Figure 2:
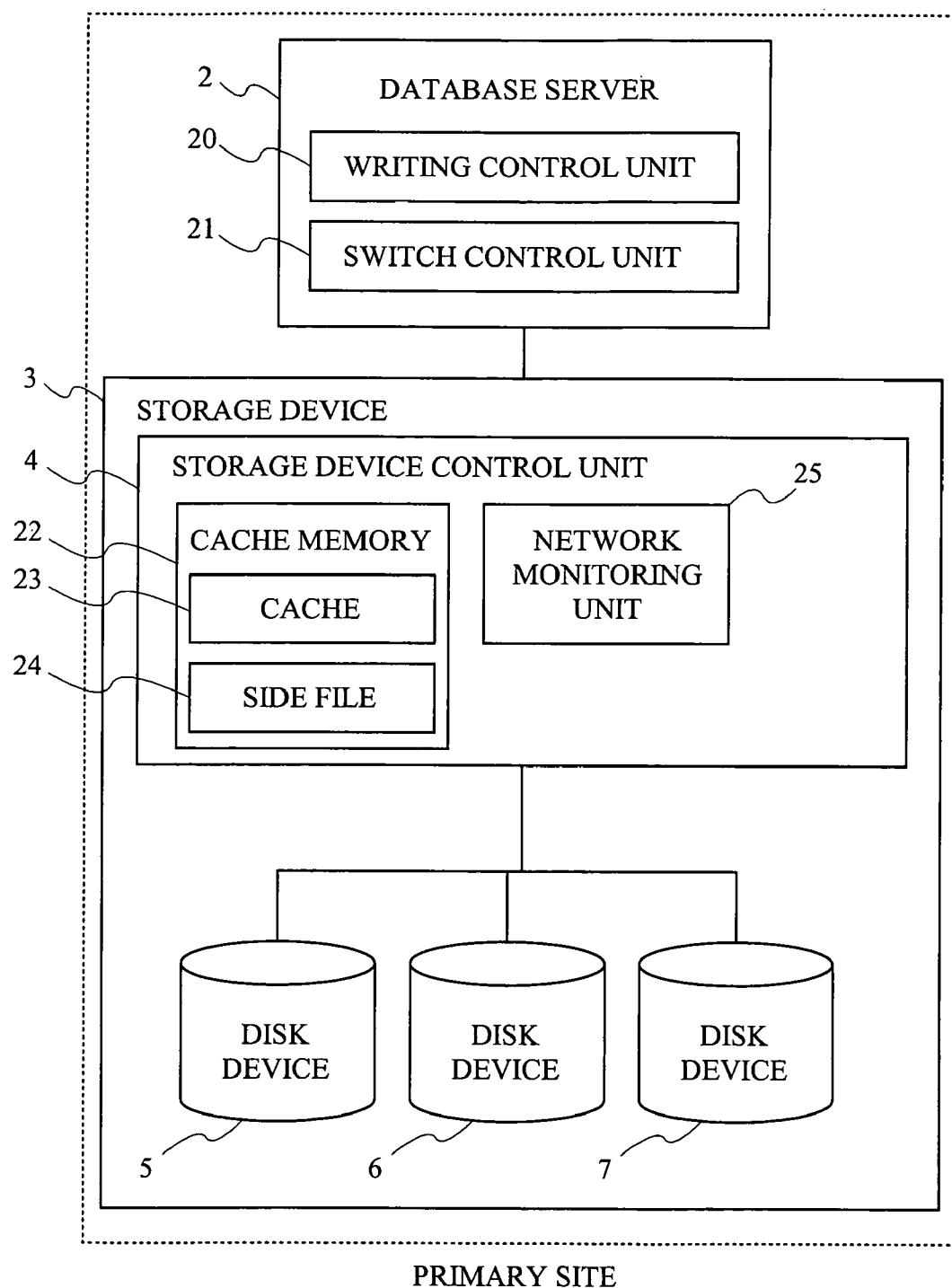
FIG. 2 is a block diagram showing the configuration of the primary site according to the first embodiment of the present invention.

FIG. 2 shows the configuration of the primary site in the first embodiment. In the primary site, the database server 2 includes a writing control unit 20 and a switch control unit 21, and the storage device control unit 4 in the storage device 3 includes a cache memory 22 and a network monitoring unit 25. The cache memory 22 is composed of a cache 23 and a side file 24.

When the write request is issued from the database server 2, if the disk device to which the writing of the update log is requested is copied between the storage devices 3 and 13 by the synchronous transmission, this update log is stored in the cache 23 and transmitted to the storage device 13 through the storage device connection interface 9. Also, if the disk device to which the writing of the update log is requested is copied between the storage devices 3 and 13 by the asynchronous transmission, this update log is stored in the side file 24 and transmitted to the storage device 13 through the storage device connection interface 9.

In the network monitoring unit 25, the response time required for the copy between the storage devices 3 and 13 is monitored, and based on this response time, the notification for switching the disk device to which the writing of update log is requested is issued to the switch control unit 21 of the database server 2. The switch control unit 21 which has received the switch notification switches the disk device to which the writing is requested by the database server 2.

When the copy between the storage devices 3 and 13 is switched from the asynchronous transmission to the synchronous transmission by the switch of the disk devices, the online processing received by the database server 2 through the operation network 1 is put in a waiting state by the writing control unit 20 in the database server 2 until the update log stored in the side file 24 is all copied to the storage device 13. Therefore, the copies by the synchronous transmission and the asynchronous transmission between the storage devices are not performed at the same time, and either the copy by the synchronous transmission or the asynchronous transmission is performed between the storage devices.

In the remote site, the orderliness of the update can be ensured.

Figure 3:
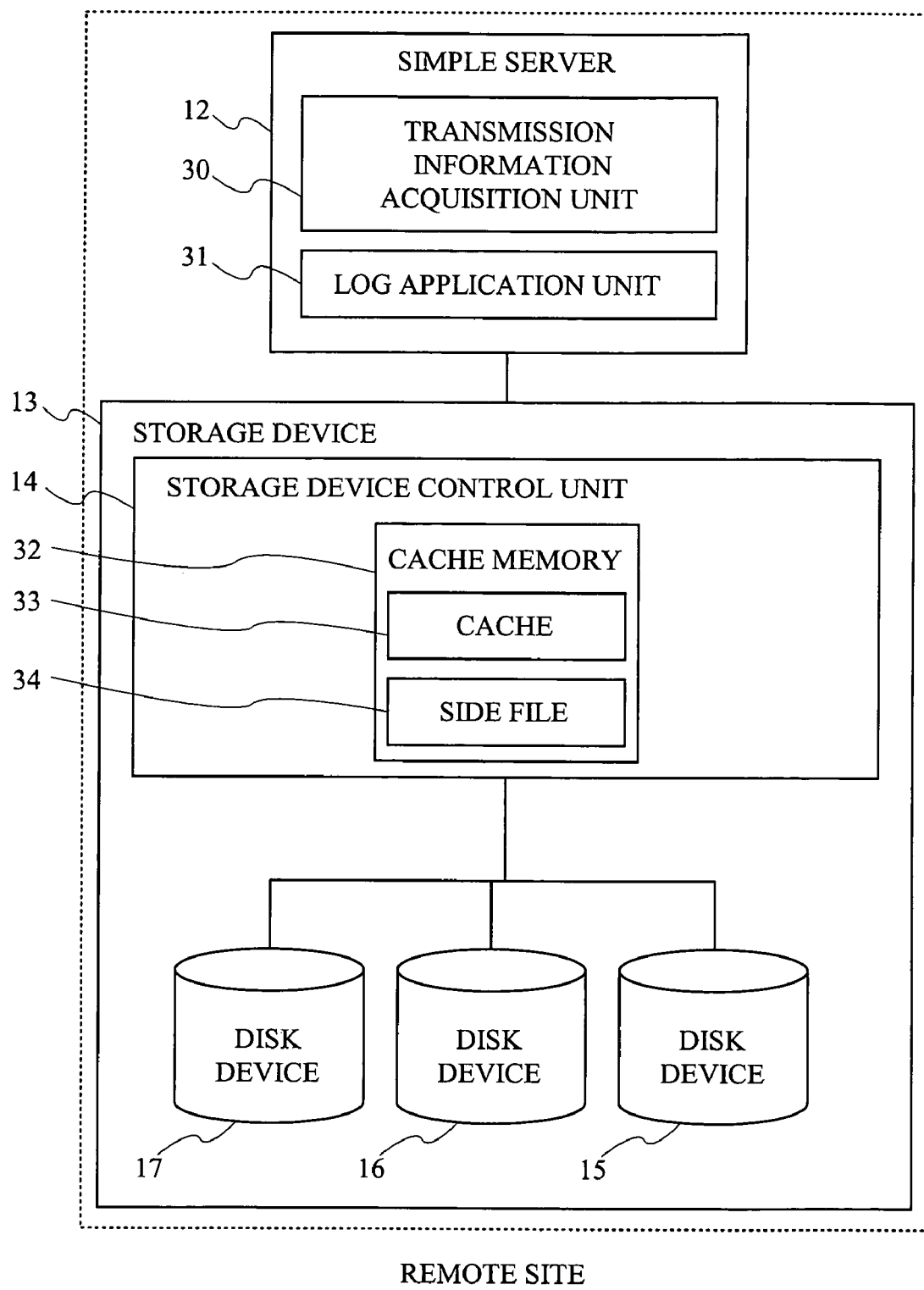
FIG. 3 is a block diagram showing the configuration of the remote site according to the first embodiment of the present invention.

FIG. 3 shows the configuration of the remote site in the first embodiment. In the remote site, the simple server 12 includes a transmission information acquisition unit 30 and a log application unit 31, and the storage device control unit 14 of the storage device 13 includes a cache memory 32. The cache memory 32 is composed of a cache 33 and a side file 34.

The cache 33 and the side file 34 have the same function as the cache 23 and the side file 24 of the primary site. However, the update logs copied by the asynchronous transmission from the storage device 3 are rearranged in order of the update when they are stored in the side file 34 of the storage device 13, and then, written in the disk device of the storage device 13. By doing so, the disk device in the storage device 13 of the remote site is updated in the same order as the data written in the storage device 3 by the online processing of the primary site.

In the remote site, the update log is read from the disk device copied by the synchronous transmission or the asynchronous transmission between the storage devices 3 and 13, and this update log is executed in the log application unit 31 of the simple server 12. Then, the created update data is written to the disk device in the storage device 13. In this manner, the backup of the data of the primary site is created in the remote site.

In the transmission information acquisition unit 30 of the simple server 12, the state of the remote copy function used in the copy between the storage devices 3 and 13 is stored. Therefore, it is possible to confirm which of the synchronous transmission or the asynchronous transmission is currently used for the copy between the storage devices 3 and 13 by the transmission information acquisition unit 30.

The data copy method and the data copy operation in the DR system using log synchronous transmission method according to the first embodiment will be described below with reference to FIG. 1 to FIG. 3. In this embodiment, the data copy is performed between the primary site in which the online processing is generally executed and the remote site for backing up the data retained in the primary site.

First, in order to realize the data copy method of the DR system using log synchronous transmission method, the primary site and the remote site are initialized.

As the initial setting of the primary site, the database in accordance with the operation system is established. In the storage device 3, the disk devices 5, 6 and 7 accessible from the database server 2 are allocated by the storage device control unit 4. The database server 2 sets the disk device 5 for retaining the data of the database and the disk devices 6 and 7 for retaining the log of the database.

In the remote site, the disk devices 15, 16 and 17 are set so as to have the same configuration as that in the primary site. In the storage device 13, the disk device 15 similar to the disk device 5 which is made accessible from the database server 2 in the storage device 3, the disk device 16 similar to the disk device 6 and the disk device 17 similar to the disk device 7 are allocated by the storage device control unit 14 so as to be accessible from the simple server 12. Similar to the database server 2, the simple server 12 sets the disk device 15 for retaining the data of the database and the disk devices 16 and 17 for retaining the log of the database.

In this embodiment, the simple server 12 is provided in order to reestablish the data of the database server 2 in the storage device 13 of the remote site by executing the log of the database server 2. However, it is also preferable to provide the same function as that of the database server 2 to the simple server 12.

Next, it is set up to copy the disk devices 6 and 7 in which the log of the database is retained to the disk devices 16 and 17 through the storage device connection interface 9 between the storage device 3 of the primary site and the storage device 13 of the remote site. For this copy, both of the synchronous transmission and the asynchronous transmission which are the remote copy function of the storage device are set. In this embodiment, the synchronous transmission is set for the remote copy of the disk device 6 and the disk device 16, and the asynchronous transmission is set for the remote copy of the disk device 7 and the disk device 17.

When the setting as described above is completed in the database server 2, the simple server 12 and the storage devices 3 and 13, the online processing is started in the database server 2 of the primary site. The sequence of the data copy will be described below.

(First Data Copy Step 1000)

The online processing request is sent to the database server 2 through the operation network 1. The online processing request is transmitted in accordance with the protocol on the operation network 1 and includes the components for referencing to or updating the data contents managed by the database server 2. For example, it is composed of the combination of SQL commands transmitted by the TCP/IP protocol.

The database server 2 which has received the online processing request analyses the network protocol layer and executes the online processing to the database. For example, it analyses the TCP/IP protocol to take the SQL commands and executes the processing in the database.

(Second Data Copy Step 1001)

When the contents of the online processing include the update processing of the database, the data retained in the storage device 3 needs to be updated. In such a case, the database server 2 issues the instruction through the server/storage connection interface 8 to the storage device control unit 4 of the storage device 3 to update the data of the disk device 5 and to write the update log to the disk device 16 or the disk device 17. It corresponds to, for example, the transmission of SCSI command through the fiber channel cable to the disk controller after attaching a host adaptor to the database server 2. Also, in the description of this embodiment, the write request is issued only once for the simplification. In an actual case, however, the transmission of the write request to the other disk device is separated into several requests.

(Third Data Copy Step 1002)

The storage device control unit 4 which has received the request to write data writes the data update to the disk device 5, and writes the update log to the disk device 6 or the disk device 7. The writing of update log is not performed to the disk devices 6 and 7 at the same time but to either the disk device 6 or 7.

(Fourth Data Copy Step 1003)

When the write request of the update log specifies the disk device 6, since the disk device 6 is set to be copied to the disk device 16 in the storage device 13 of the remote site by the synchronous transmission, the storage device control unit 4 stores the update log of the disk device 6 in the cache 23, transmits it to the cache 33 in the storage device control unit 14, and instructs the storage device control unit 14 to write it in the disk device 16. Then, the storage device control unit 14 writes it in the disk device 16. For example, it can be realized by setting the remote copy function of the disk devices 6 and 16 by using the management software of the storage device connection interface 9.

(Fifth Data Copy Step 1004)

Also, when the write request of the update log specifies the disk device 7, since the disk device 7 is set to be copied to the disk device 17 in the storage device 13 of the remote site by the asynchronous transmission, the storage device control unit 4 stores the update log of the disk device 7 in the side file 24, transmits it to the side file 34 in the storage device control unit 14, and instructs the storage device control unit 14 to write it in the disk device 17. Then, the update log stored in the side file 34 is rearranged in order of the update in the primary site, and then, the storage device control unit 14 writes it in the disk device 17. For example, it can be realized by setting the remote copy function of the disk devices 7 and 17 by using the management software of the storage device connection interface 9.

(Sixth Data Copy Step 1005)

After executing the update to the disk devices 16 and 17, since the storage device control unit 14 is designed to notify the update by the simple server 12 in advance, the storage device control unit 14 notifies the update to the simple server 12. As the interfaces for the update notification request and the update notification, for example, the method in which the storage device control unit 14 notifies the update in response to the read request from the simple server 12 to the special disk device in the storage device, the method in which the storage device control unit 14 notifies the update in response to the exclusive command from the simple server 12 to the disk devices 16 and 17 in which the update notification is requested, and the method in which a dedicated interrupt interface for notifying the update of the disk devices from the storage device control unit 14 is provided in the simple server 12 can be used. In addition, the notification from the storage device control unit 14 to the simple server 12 is not limited to the method which is executed at each update, but the method in which the update is notified at a predetermined time interval and the method in which the instruction issued from the database server 2 to the storage device 3 is transmitted to the storage device 13 to notify the update to the simple server 12 are also available.

(Seventh Data Copy Step 1006)

The simple server 12 which has received the update notification of the disk devices 16 and 17 reads the updated data in the disk devices 16 and 17 and executes the update log written therein in the log application unit 31. Then, the simple server 12 notifies the storage device control unit 14 through the server/storage connection interface 18 to update the data on the disk device 15. For example, after attaching a host bus adaptor to the simple server 12, SCSI command is transmitted through the fiber channel cable to the disk controller.

(Eighth Data Copy Step 1007)

The storage device control unit 14 which has received the data update request writes the data update to the disk device 15.

Each time when the database server 2 of the primary system executes the online processing request, the data of the primary site is copied to the remote site in the manner described above. Therefore, it is possible to reduce the amount of data transmitted between the storage devices 3 and 13 without applying the load of the data copy to the database server 2 of the primary site and without transmitting the data for the data copy on the operation network 1. As a result, the reduction of the data copy cost and the delay of the online processing can be achieved.

Also, in this embodiment, the case where one primary site and one remote site are provided has been described. However, the method in which the data is copied from a primary site to several remote sites and the method in which data copied from a primary site to one remote site is further copied to another remote site can be also established easily.

The flowcharts of FIG. 4 to FIG. 7 show the sequence for the switching between the synchronous transmission and the asynchronous transmission from the primary site to the remote site according to this embodiment. Each flowchart will be described below.

Figure 4:
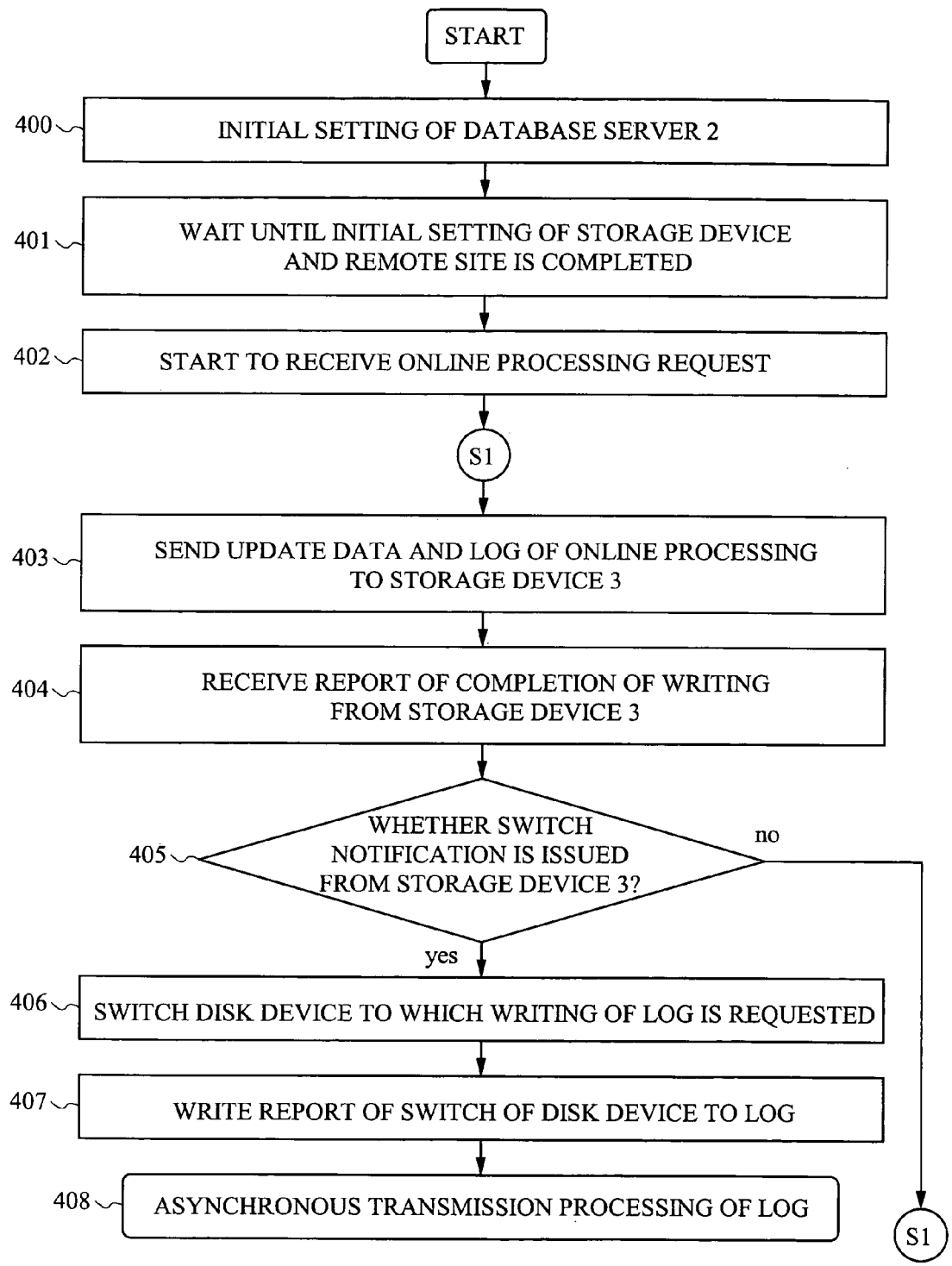
FIG. 4 is a flowchart of the database server of the primary site for explaining the switching sequence from the synchronous transmission to the asynchronous transmission in an embodiment of the present invention.

The flowchart of the sequence for switching the remote copy function of the log from the synchronous transmission to the asynchronous transmission in the database server 2 of the primary site shown in FIG. 4 will be described.

First, the database server 2 is initialized (400). For example, the initial setting includes the establishment of the database server 2 and the allocation of the disk devices in the storage device 3.

Next, it waits until the initial setting of the storage device and the remote site is completed (401). For example, it waits for the completion of the setting of the remote copy function between the storage devices and the establishment of the database of the remote site.

Through the initial setting described above, the synchronous transmission and the asynchronous transmission which are the remote copy function are set in the disk devices in the storage device 3 to which the log is to be written. At the time when the initial setting is completed, if the log writing from the database server 2 is performed, the log is copied to the storage device of the remote site by the synchronous transmission. In this description, the setting that the log of the database server 2 is written in the disk device of the storage device 3 copied by the synchronous transmission is made in the initial setting. However, it is also possible to make the setting that the log of the database server 2 is written in the disk device of the storage device copied by the asynchronous transmission in the initial setting.

When the initial setting of the primary site and the remote site is completed, the database server 2 starts to receive the online processing request (402). For example, the merchandise management in the electric trading through the Internet corresponds to the online processing.

After stating the operation as the database and the database server 2 receives the update request of the online processing, the update data and the update log are sent to the storage device 3 (403), and the database server 2 receives the report of the completion of the writing of the update data and the update log to the disk devices 5, 6 and 7 in the storage device 3 (404). Then, the update processing is completed.

After the completion of the update processing, if the notification for switching the disk device to which the writing of the update log is requested is issued from the storage device 3 of the primary site (405), the disk device to which the writing of the update log is requested is switched to the disk device copied between the storage devices by the asynchronous transmission by the switch control unit 21 (406), and the report showing the completion of the switch is written in the log (407). In this manner, the subsequent update log of the online processing is sent from the storage device 3 of the primary site to the storage device 13 of the remote site by the asynchronous transmission (408). Also, after the completion of the update processing, if the notification for switching the disk device to which the writing of the update log is requested is not issued from the storage device 3 of the primary site, the online processing is repeated.

When the database server 2 of the primary site is once operated, the database server 2 always performs the writing of the update log to the same disk device in the storage device 3 to which the remote copy function is set unless it receives the switch notification from the storage device 3.

Figure 5:
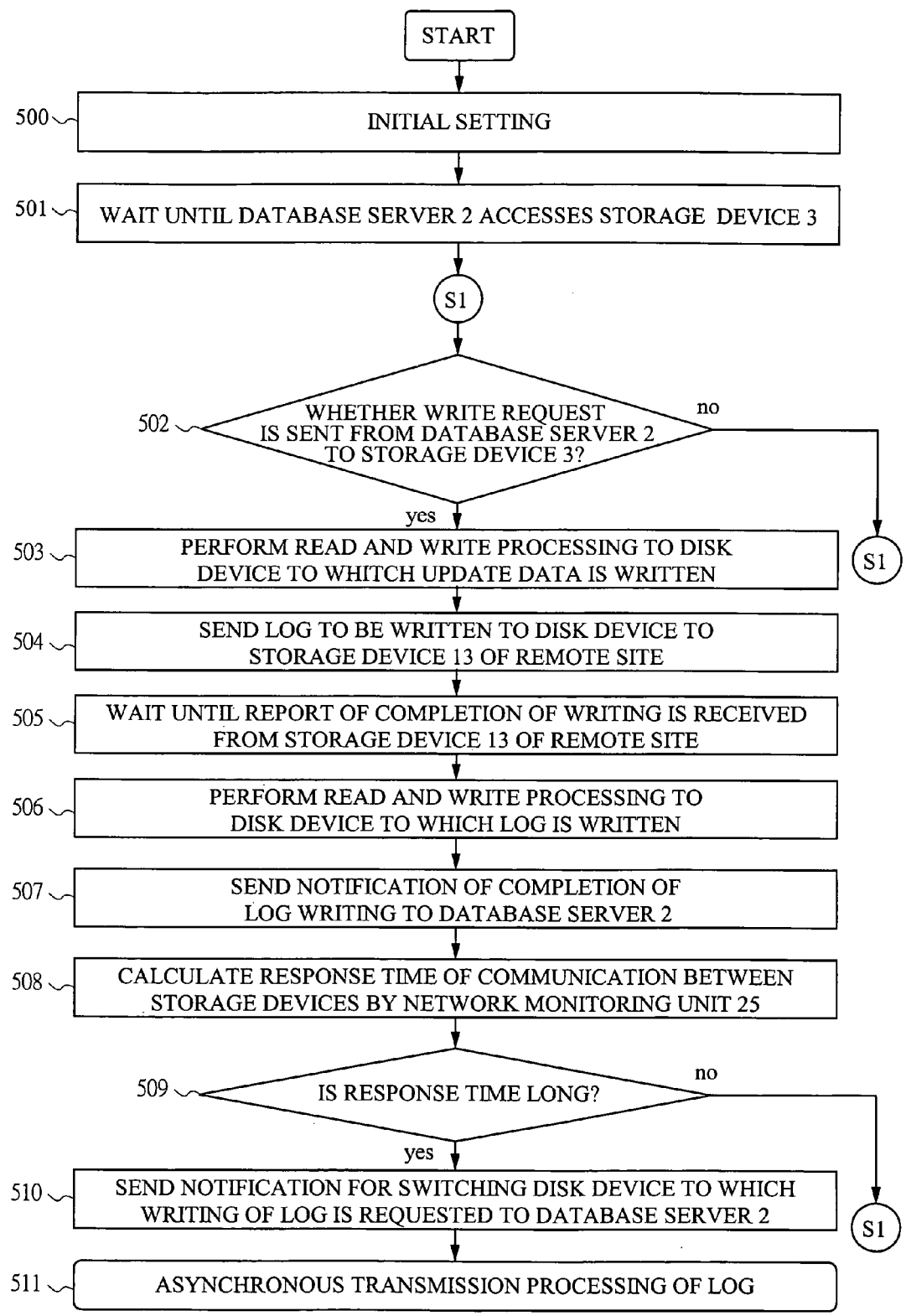
FIG. 5 is a flowchart of the storage device of the primary site for explaining the switching sequence from the synchronous transmission to the asynchronous transmission in an embodiment of the present invention.

Next, the flowchart of the sequence for switching the remote copy function of the log from the synchronous transmission to the asynchronous transmission in the storage device 3 of the primary site shown in FIG. 5 will be described.

First, the storage device 3 is initialized (500). For example, the initial setting includes the setting of the disk devices allocated to the database server 2, the acquisition of the response time required for the communication between the storage devices, and the remote copy setting between the storage devices. After the completion of the initial setting of the storage device 3, it waits until the database server 2 accesses the storage device 3 (501).

When the write request is issued from the database server 2 to the storage device 3 (502), after the area in which the update data is written is taken in the cache 22 from the disk device in the storage device 3, the update data is written in this area, and then, returned to the original disk device (503). Also, after the area in which the update log is written is taken in the cache 22 from the disk device in the storage device 3, the update log is written in this area, and then, returned to the original disk device (506).

The update log sent from the database server 2 to the storage device 3 is sent to the storage device 13 of the remote site through the storage device connection interface 9 (504), the storage device 3 of the primary site is in a waiting state until receiving the notification of the completion of the writing of the update log to the disk device in the storage device 13 of the remote site (505), and when the notification of the completion of the writing is received from the remote site, the notification of the completion of the writing of the update log is sent to the database server 2 (507).

The response time required for the transmission of the update log described above from the storage device 3 of the primary site to the storage device 13 of the remote site is calculated by the network monitoring unit 25 (508). When the response time is long (509), the notification for switching the disk device to which the writing is requested is issued to the database server 2 (510). When the response time is short, the processing in response to the read/write request from the database server 2 to the storage device 13 is repeated.

Figure 6:
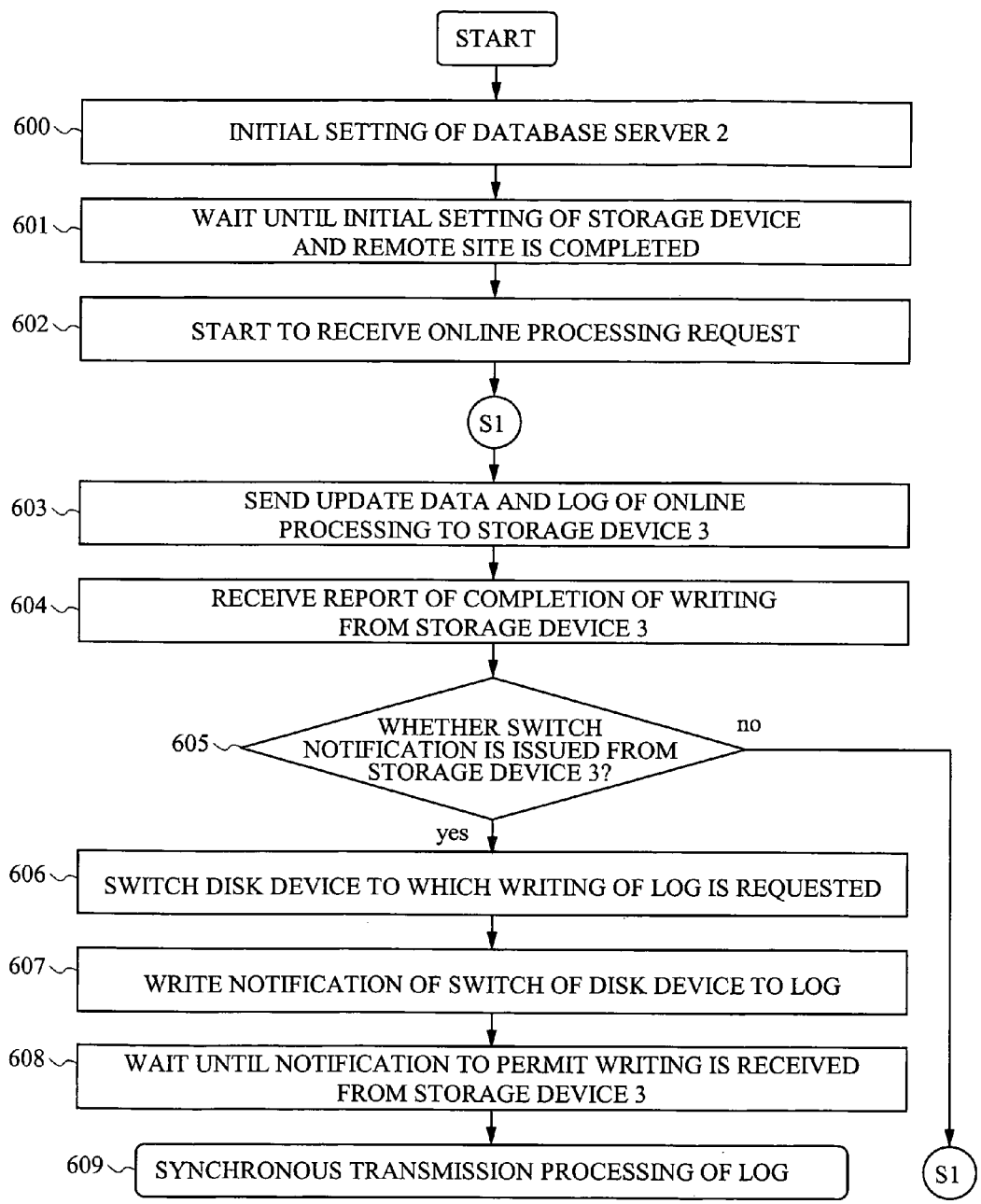
FIG. 6 is a flowchart of the database server of the primary site for explaining the switching sequence from the asynchronous transmission to the synchronous transmission in an embodiment of the present invention.

The flowchart of the sequence for switching the remote copy function of the log from the synchronous transmission to the asynchronous transmission in the database server 2 of the primary site shown in FIG. 6 will be described.

First, the database server 2 is initialized (600). For example, the initial setting includes the establishment of the database server 2 and the allocation of the disk devices in the storage device 3.

Next, it waits until the initial setting of the storage device and the remote site is completed (601). For example, it waits for the completion of the setting of the remote copy function between the storage devices and the establishment of the database of the remote site.

Through the initial setting described above, the synchronous transmission and the asynchronous transmission which are the remote copy function are set to the disk devices in the storage device 3 to which the log is to be written. At the time when the initial setting is completed, if the log writing from the database server 2 is performed, the log is copied to the storage device of the remote site by the asynchronous transmission. In this description, the setting that the log of the database server 2 is written to the disk device of the storage device 3 by the asynchronous transmission is made in the initial setting. However, it is also possible to make the setting that the log of the database server 2 is written to the disk device of the storage device 3 copied by the synchronous transmission in the initial setting.

When the initial setting of the primary site and the remote site is completed, the database server 2 starts to receive the online processing request (602). For example, the merchandise management in the electric trading through the Internet corresponds to the online processing.

After stating the operation as the database and the database server 2 has received the update request of the online processing, the update data and the update log are sent to the storage device 3 (603), and the report of the completion of the writing of the update data and the update log to the disk device in the storage device 3 is received (604). Then, the update processing is completed.

After the completion of the update processing, if the notification for switching the disk device to which the writing of the update log is requested is issued from the storage device 3 of the primary site (605), the disk device to which the writing of the update log is requested is switched to the disk device copied between the storage devices by the synchronous transmission by the switch control unit 21 (606), and the report showing the completion of the switch is written in the log (607). Then, the reception of the online processing request in the database server is stopped by the writing control unit 20 until the notification to permit the writing is received from the storage device 3 (608). Also, if the notification for switching the disk device is not issued, the online processing is repeated.

After receiving the notification to permit the writing from the storage device 3, the update log of the online processing is sent from the storage device 3 of the primary site to the storage device 13 of the remote site by the synchronous transmission (609).

If the database server 2 of the primary site is once operated, the database server 2 always performs the writing of the update log to the same disk device in the storage device 3 to which the remote copy function is set unless it receives the switch notification from the storage device 3.

Figure 7:
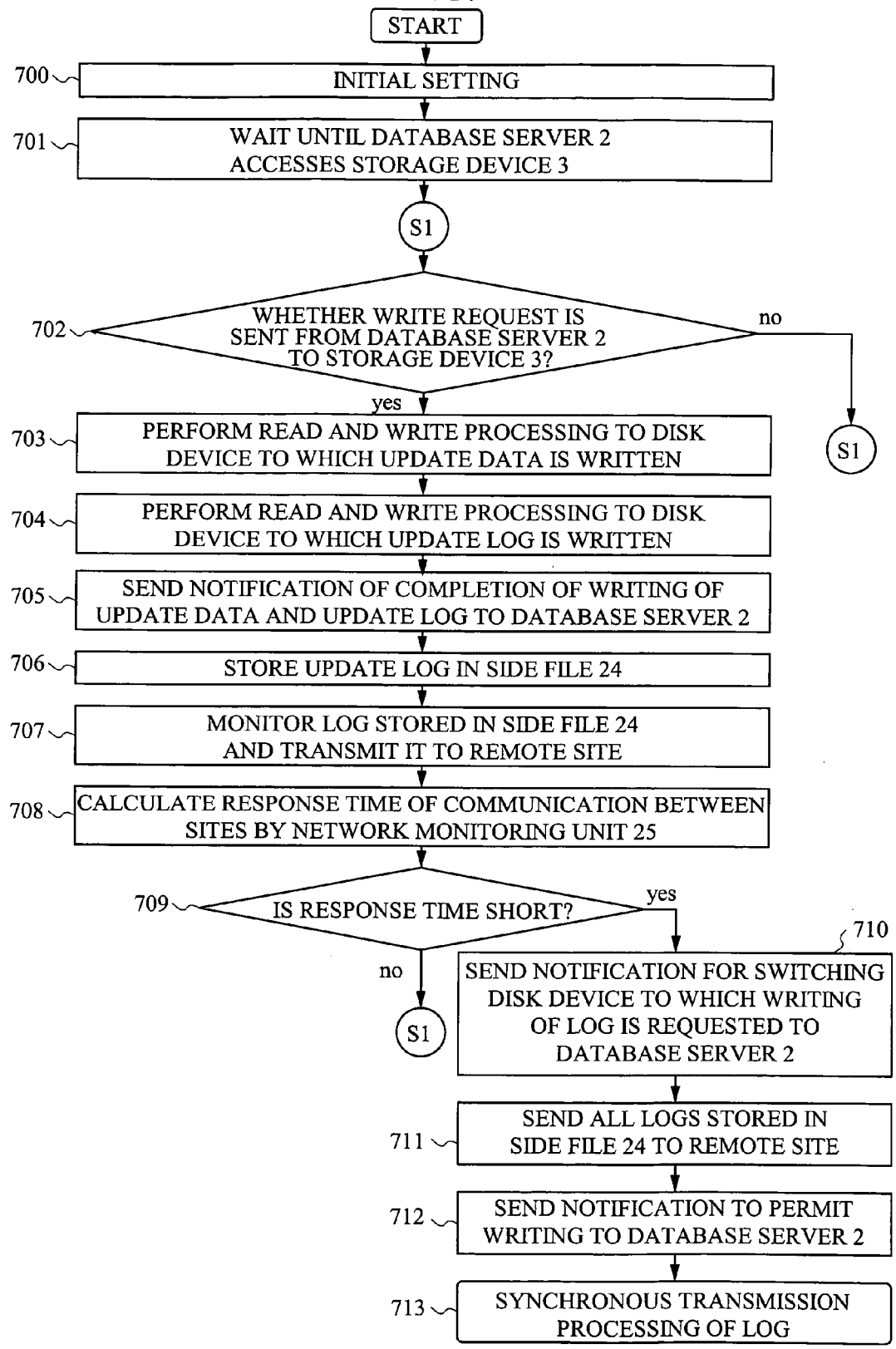
FIG. 7 is a flowchart of the storage device of the primary site for explaining the switching sequence from the asynchronous transmission to the synchronous transmission in an embodiment of the present invention.

Next, the flowchart of the sequence for switching the remote copy function of the log from the asynchronous transmission to the synchronous transmission in the storage device 3 of the primary site shown in FIG. 7 will be described.

First, the storage device 3 is initialized (700). For example, the initial setting includes the setting of the disk devices allocated to the database server 2, the acquisition of the response time required for the communication between the storage devices, and the remote copy setting between the storage devices. After the completion of the initial setting of the storage device 3, it waits until the database server 2 accesses the storage device 3 (701).

When the write request is issued from the database server 2 to the storage device 3 (702), after the area in which the update data is written is taken in the cache 22 from the disk device in the storage device 3, the update log is written in this area, and then, returned to the original disk device (703). Also, after the area in which the update log is written is taken in the cache 22 from the disk device in the storage device 3, the update data is written in this area, and then, returned to the original disk device (704).

After the completion of the writing of the update data and the update log to the disk device in the storage device 3 as described above, the notification of the completion of the writing is sent to the database server 2 (705).

The update log written to the disk device in the storage device 3 is stored in the side file 24 in the cache memory 22 (706), and sent to the storage device 13 of the remote site through the storage device connection interface 9 (707).

The response time required for the transmission of the update log described above from the storage device 3 of the primary site to the storage device 13 of the remote site is calculated by the network monitoring unit 25 (708). When the response time is short (709), the notification for switching the disk device to which the writing is requested is issued to the database server 2 (710), all of the update logs stored in the side file 24 are sent to the storage device 13 of the remote site (710), and the notification to permit the writing is sent to the database server 2 (711).

When the response time between the storage devices is long, the processing in response to the read/write request from the database server 2 to the storage device 13 is repeated.

According to the DR system using log synchronous transmission method described above, the response time required for the transmission between the storage devices is monitored, so that the asynchronous transmission is used when the response time is long and the synchronous transmission is used when the response time is short. Therefore, the online performance of the primary site can be maintained without being influenced by the line utilization rate between the storage devices.

In this embodiment, the method in which the asynchronous transmission and the synchronous transmission are set in the separate disk devices and switched therebetween has been described. However, it is also possible to make the setting to switch the synchronous transmission and the asynchronous transmission in one disk device.

Also, when switching from the asynchronous transmission to the synchronous transmission, it is necessary to monitor the update log stored in the side file. However, if only the last update log of the update logs sent by the asynchronous transmission is sent by the synchronous transmission, the switching from the asynchronous transmission to the synchronous transmission can be done without monitoring the side file.

Figure 8:
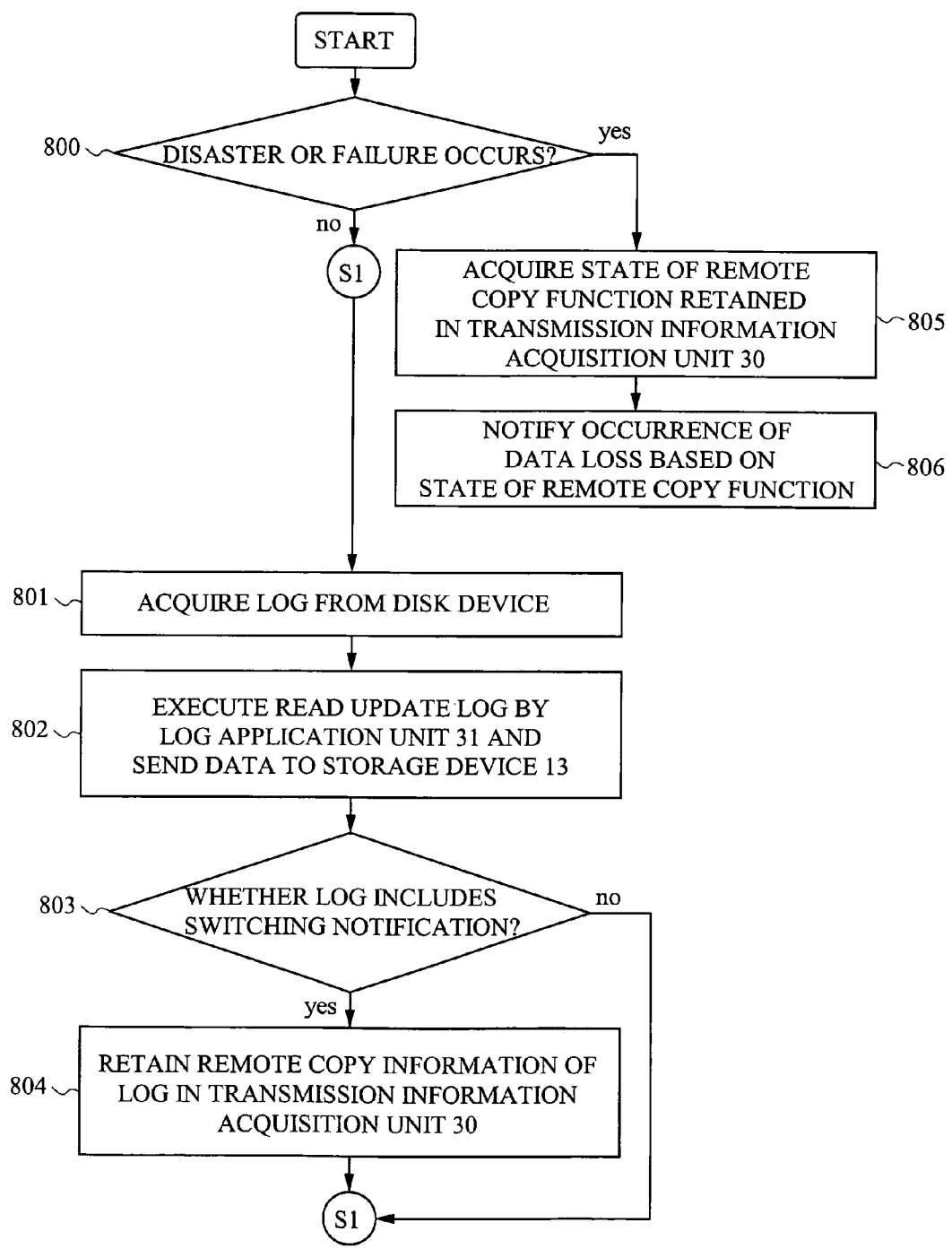
FIG. 8 is a flowchart of the simple server of the remote site for explaining the acquisition sequence of the data loss information in an embodiment of the present invention.

FIG. 8 shows the flowchart of the sequence for determining the occurrence of the backup data loss in the remote site when a disaster or failure occurs according to this embodiment.

The flowchart of the sequence for acquiring the data loss information in the simple server 12 of the remote site shown in FIG. 8 will be described.

First, when the disaster or the failure does not occur (800), the update log copied from the storage device 3 of the primary site to the disk device in the storage device 13 of the remote site is read (801), and the read update log is executed by the log application unit 31. Then, the created update data is sent to the storage device 13 (802).

When the update log read from the storage device 13 includes the information that the disk device to which the writing of the update log is requested in the primary site has been switched (803), the state of the remote copy function of the log is retained in the transmission information acquisition unit 30 (804). The state of the remote copy function indicates the synchronous transmission or the asynchronous transmission, and the remote copy function currently used for the copy between the storage devices can be grasped by the transmission information acquisition unit 30.

Also, when the update log does not include the switch notification of the disk device in the primary site, the update log is executed in the log application unit 31, and the processing for writing the created update log to the storage device 13 is repeated.

In this state, when the disaster or the failure occurs (800), the state of the remote copy function stored in the transmission information acquisition unit 30 is acquired (805), and it is notified whether there is the data loss in the backup of the remote site based on this state of the remote copy function (806). If the synchronous transmission is used as the remote copy function between the storage devices when the disaster or the failure occurs, since the update contents of the primary site are surely reflected on the remote site, it can be understood that there is no data loss in the backup in the remote site. Also, if the asynchronous transmission is used as the remote copy function between the storage devices, since the update contents of the primary site are not always reflected on the remote site. Therefore, it can be understood that there is the possibility that the data loss occurs in the backup of the remote site.

If the information of the data loss can be acquired when the disaster or the failure occurs, the state of the backup in the remote site can be understood. Therefore, it is possible to reduce the time required for the recovery from the disaster or the failure.

In this embodiment, the state of the remote copy function stored in the transmission information acquisition unit 30 is acquired from the update log copied between the storage devices. However, it can be acquired from the state of the remote copy function set to the disk device in the storage device 13 to be the storage destination of the read update log by the log application unit 31 of the remote site.

In the log application unit 31 of the remote site, the date recovery processing is performed for all of the update logs stored in the disk device in the storage device 3 of the primary site, which are to be stored in the disk device in the storage device 13 of the remote site. Therefore, even when the copy between the storage devices is performed by both the synchronous transmission and the asynchronous transmission, the log application unit 31 reads the update logs in order of update and performs the data recovery processing.

More specifically, when the state of the remote copy function is acquired from the update log read by the log application unit 31 as described above, the log application unit 31 recovers the data in order of update even if the copy between the storage devices is immediately switched from the synchronous transmission to the asynchronous transmission or from the asynchronous transmission to the synchronous transmission. Therefore, it is possible to properly determine the occurrence of the data loss even if the disaster and the failure occur. Furthermore, since it is possible to immediately switch the asynchronous transmission and the synchronous transmission, the control for the monitoring processing of the side file 24 in the primary site and the online processing by the writing control unit 20 of the database server 2 becomes unnecessary.

Second Embodiment

The DR system using log synchronous transmission method according to the second embodiment will be described below, in which the switch notification of the disk device to which the update log is written is sent between servers.

In the first embodiment, the switch notification of the disk device to which the update log is written is notified to the remote site by writing it to the log. In this embodiment, however, another switch notification method will be described with reference to FIG. 9.

Figure 9:
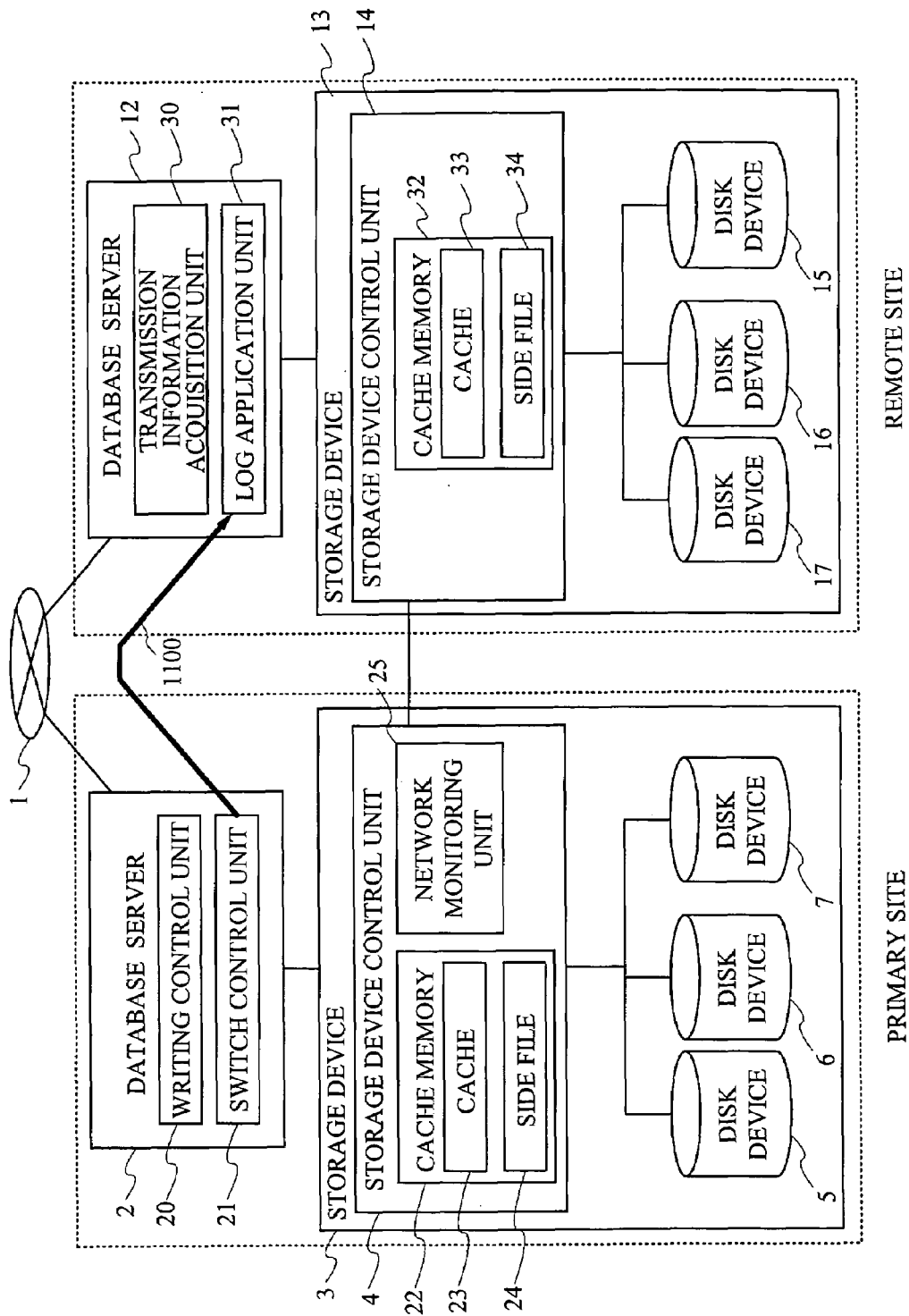
FIG. 9 is a block diagram showing the entire configuration of the DR system using log synchronous transmission method according to the second embodiment of the present invention.

FIG. 9 is a block diagram showing an example of the configuration of the DR system using log synchronous transmission method, in which the state of the remote copy function is stored in the transmission information acquisition unit 30 through the communication between servers.

In this embodiment, after switching the disk device to which the writing of the update log in the primary site is requested, the switch notification signal is sent to the remote site through the operation network 1 (1100). By doing so, in the remote site, the state of the remote copy function can be stored in the transmission information acquisition unit 30 without acquiring the state of the remote copy function from the update log from the storage device 13.

Also, the switch notification signal described above is needed to represent only three states, that is, the state of switching from the synchronous transmission to the asynchronous transmission, the state of switching from the asynchronous transmission to the synchronous transmission, and the state of not using the remote copy function. Therefore, the notification signal can be transmitted through the line of about 2 bits, and the notification signal can be sent from the primary site to the remote site without being influenced by the line utilization rate.

Third Embodiment

The DR system using log synchronous transmission method according to the third embodiment will be described, in which a broad band line and a narrow band line are provided as the line to connect the storage devices and the lines are switched. However, the broadband line in this case generally indicates the dedicated line with a high transmission rate, and the narrow band line generally indicates the inexpensive public line with a low transmission rate.

In the first embodiment, the remote copy function is switched so as not to be influenced by the line utilization rate between the storage devices, thereby maintaining the online performance. However, in this embodiment, the method for maintaining the online performance by switching the lines used for the remote copy functions will be described with reference to FIG. 10.

Figure 10:
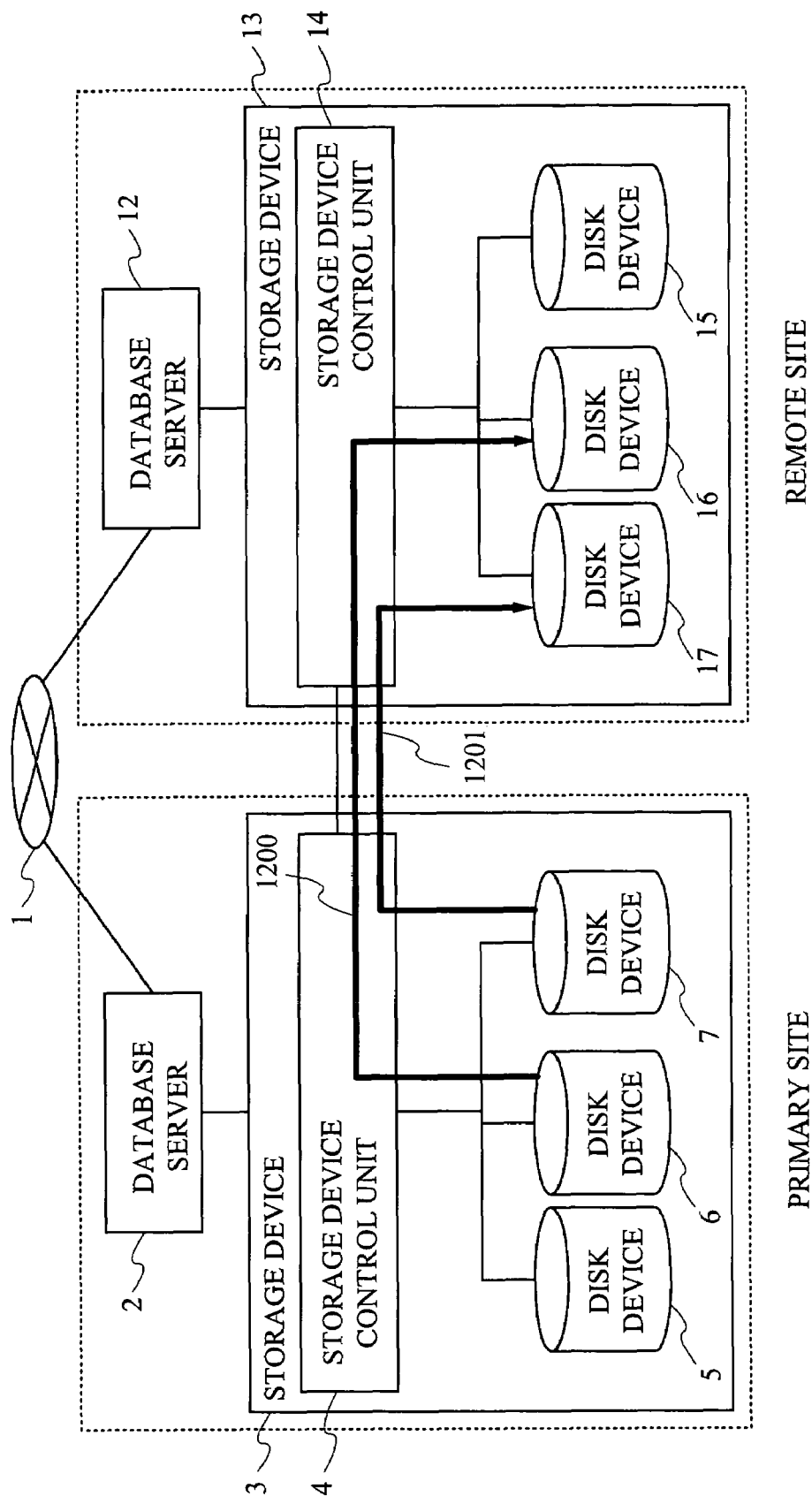
FIG. 10 is a block diagram showing the entire configuration of the DR system using log synchronous transmission method according to the third embodiment of the present invention.

FIG. 10 is a block diagram showing an example of the configuration of the DR system using log synchronous transmission method, in which the broad band line and the narrow band line connected between the storage devices are switched.

The system configuration of this embodiment is the same as that of the first embodiment. In this embodiment, however, a narrow band line is used as the line between the disk device 6 in the storage device 3 of the primary site and the disk device 16 in the storage device 13 of the remote site used for the synchronous transmission in the first embodiment (1200), and a broad band line is used as the line between the disk device 7 in the storage device 3 of the primary site and the disk device 17 in the storage device 13 of the remote site used for the asynchronous transmission in the first embodiment (1201). Also, as the remote copy function for the copy from the storage device 3 of the primary site to the storage device 13 of the remote site, only the synchronous transmission is used.

In the method for switching the lines between the storage devices according to this embodiment, similar to the first embodiment, the lines are switched depending on the response time of the transmission between the storage devices. When the response time of the transmission between the storage devices is long, the broad band line is used, and when the response time of the transmission between the storage devices is short, the narrow band line is used. By doing so, it is possible to maintain the online performance of the primary site without being influenced by the response time between the storage devices.

In this embodiment, since the synchronous transmission is used for the copy from the storage device 3 of the primary site to the storage device 13 of the remote site, the monitoring of the side file is unnecessary, and the lines between the storage devices can be easily switched. Also, due to the synchronous transmission between the storage devices, it is assured that the date in the primary site is all copied to the remote site. Therefore, since there is no data loss in the backup in the remote site even when the disaster or the failure occurs, it is unnecessary to acquire the notification of the data loss.

What is claimed is:

1. In a computer system including:
   a first computer which executes a data base management system,
   a first storage system coupled the first computer and including a cache memory,
   a side file memory,
   a first disk apparatus and a second disk apparatus, a second storage system coupled to the first storage system via a remote copy line,
   a second computer coupled to the second storage system,
   a remote copy managing method for managing two copy modes, either a first copy mode or a second copy mode is used for a remote copy to transfer update log data between the first storage system and the second storage system via the remote copy line, the update log data is update history information to update database in the database management system, comprising the steps of:
   assigning the first disk apparatus to using the first copy mode and the second disk apparatus to using the second copy mode;
   sending, by the host computer, a write request including the update log data, and a write destination to store the update log data, to the first storage system;
   receiving, by the first storage system, the write request from the first computer;
   storing, by the first storage system, the update history information, based on the write destination to either the first disk apparatus in the first copy mode or the second disk apparatus in the second copy mode;

holding the update history information in either the cache memory for the first copy mode or the side file memory for the second copy mode;

transferring, by the first storage system, the update history information to the second storage system via the remote copy line in the first copy mode or the second copy mode;

sending completion notification of the write request to the host computer either after confirmation of receiving in the second storage system for the first copy mode or without confirmation of receiving in the second storage system for the second copy mode;

monitoring, by the first storage system, use rate of the remote copy line to transfer the update log data from the first storage system to the second storage system;

if a monitored use rate is a first predetermined value, sending, by the first storage system, a notification for changing copy mode to the host computer;

changing, by the host computer, a write destination between either the first disk apparatus for the first copy mode or the second disk apparatus for the second copy mode if the notification is received from the first storage system;

sending, by the first host computer, to the first storage system, a record for change history of the write destination to the first storage system; and, storing, by the first storage system, a record for change history of the write destination to either the first disk apparatus or the second disk apparatus.

2. A remote copy management method according to claim 1, when the second copy mode is executed and a result of the step of monitoring indicates the use rate of the remote copy is equal or lower than the first predetermined value, further comprising the steps of:

prohibiting, by the first storage system, the write request from the host computer;

transferring, by the first storage system, the update history information in the side file memory;

sending, by the first storage system, notification of allowance to send a write request from the host computer after completion to transfer the update history information; and receiving a write request including a write destination which indicates the first disk apparatus for the first copy mode.

3. A remote copy management method according to claim 2, wherein the second storage system includes the third disk apparatus for the first copy mode and the fourth disk apparatus for the second copy mode, further comprising steps of:

transferring, by the first storage system, the record for change history of the write destination to either the first disk apparatus or the second disk apparatus to the second storage system;

storing, by the second storage system, the record for change history of the write destination to either the third disk apparatus for the first copy mode or the fourth disk apparatus for the second copy mode;

obtaining, by the second computer, the record for change history of the write destination from either the third disk apparatus or the fourth disk apparatus, and judgment, by the second computer, whether the first copy mode or the second copy mode has been executed based on the obtained record for change history of the write destination.

4. A computer system comprising:

a first computer, which includes a database, to execute a database management system;

a first storage system coupled to the first computer system and including a cache, a side file memory, a first disk apparatus and a second disk apparatus;

a second storage system which includes a third disk apparatus and a fourth disk apparatus and coupled to the first storage system via a remote copy line; and a second computer coupled to the second storage system, wherein the first disk apparatus is assigned for a first copy mode and the second disk apparatus is assigned for a second copy mode, wherein the cache is configured for the first copy mode to hold a copy of update log information which is used for updating databases to transfer to the second storage system, wherein the side file memory is configured for the second copy mode to hold a copy of the update log information to transfer to the second storage system, wherein the third disk apparatus is assigned for the first copy mode and is configured to copy update log information, wherein the fourth disk apparatus is assigned for the second copy mode and is configured to copy update log information, and wherein the first storage system receives a write request including the update log data, and a write destination which indicates either the first disk apparatus or the second disk apparatus to store the update log data, stores, the update history information, based on the write destination to either the first disk apparatus for the first copy mode or the second disk apparatus for the second copy mode;

transfers, by the first storage system, the update history information to the second storage system via the remote copy line;

sends completion of the write request to the host computer either after confirmation of storing in a disk apparatus of the second storage system in the first copy mode or without confirmation of storing the disk apparatus of the second storage system in the second copy mode;

monitors use rate of the remote copy line to transfer the update log data from the first storage system to the second storage system;

if monitored use rate is a first predetermined value, sends notification for changing copy mode to the host computer;

receives a record for change history of the write destination between either the first disk apparatus for the first copy mode or the second disk apparatus for the second copy mode, and stores a record for change history of the write destination to either the first disk apparatus or the second disk apparatus.

5. A computer system according to claim 4, when the second copy mode is executed and result for monitor indicates the use rate of the remote copy is equal or lower than the first predetermined value, wherein the first storage system prohibits the write request from the host computer, transfers the update history information in the side file memory;

sends a notification of allowance to send a write request from the first computer after completion to transfer the update history information; and receives a write request including a write destination which indicates the first disk apparatus for the first copy mode.

6. A computer system according to claim 5, wherein the first storage system transfers the record for change history of the write destination to either the first disk apparatus or the second disk apparatus to the second storage system, wherein the second storage system stores the record for change history of the write destination to either the third disk apparatus for the first copy mode or the fourth disk apparatus for the second copy mode, and wherein the second computer obtains the record for change history of the write destination from either the third disk apparatus or the fourth disk apparatus;

judges whether the first copy mode or the second copy mode has been executed based on the obtained record for change history of the write destination.

7. A first storage system coupled to a first computer via a first network, to a second storage system via a remote copy line, comprising:

a storage control unit which includes a cache memory for a first copy mode to transfer, via the remote copy line to the second storage system, a copy of update data from the first computer and a side file memory for a second copy mode to transfer, via the remote copy line to the second storage system, a copy of data from the first computer;

a first disk apparatus coupled to the storage control unit; and a second disk apparatus coupled to the storage control unit, wherein the storage control unit, if a write request from the first computer includes a write destination indicating the first disk apparatus, executes a first copy mode and sends, to the first computer, notification for completion of the write request without a wait for receiving a notification of receipt for the copy in the second storage system, and wherein the storage control, if a write request from the first computer includes a write destination indicating the second disk apparatus, executes a second copy mode and sends, to the first computer, notification for completion of the write request after receiving notification of receipt for the copy in the second storage system.

* * * * *